(No Model.)
J. H. SNAPP.
RACING HARNESS ATTACHMENT.
No. 599,365. Patented Feb. 22, 1898.
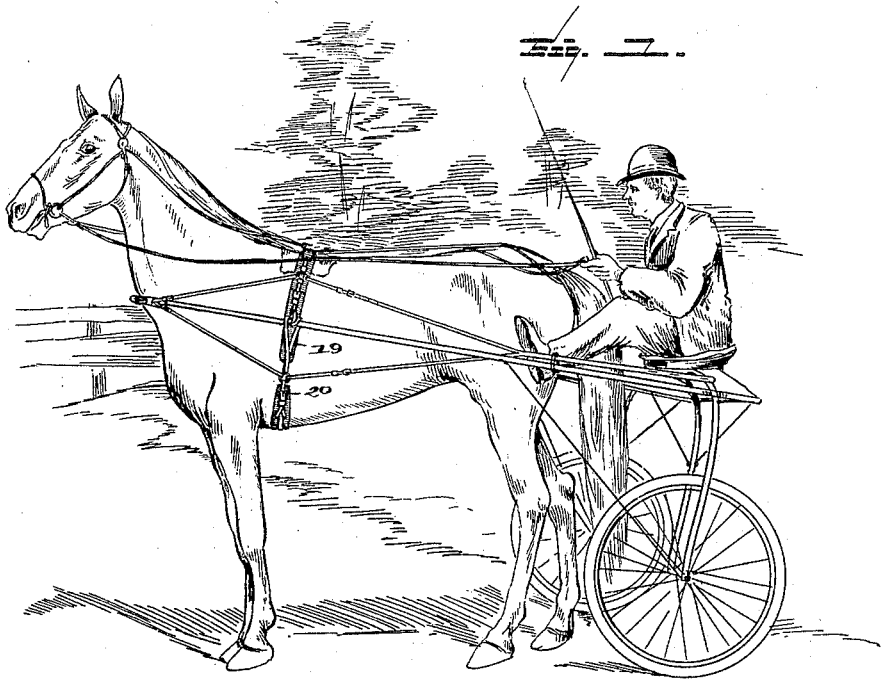
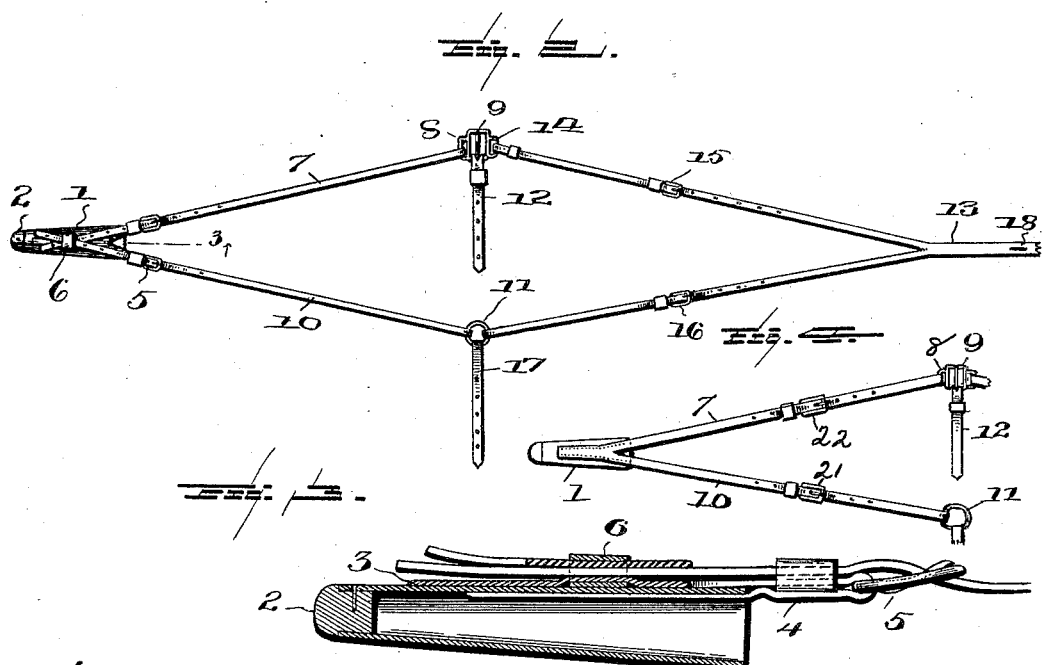
Witnesses:
L. C. Hills
W. A. Roberts
Inventor:
J. H. Snapp
By Glascock & Co.
Attys.

UNITED STATES PATENT OFFICE.

JOHN H. SNAPP, OF WASHINGTON, DISTRICT OF COLUMBIA.

RACING-HARNESS ATTACHMENT.

SPECIFICATION forming part of Letters Patent No. 599,365, dated February 22, 1898.

Application filed May 1, 1897. Serial No. 634,741. (No model.)

*To all whom it may concern:*

Be it known that I, JOHN H. SNAPP, a citizen of the United States, residing at Washington, in the District of Columbia, have invented a certain new, useful, and valuable Improvement in Racing-Harness Attachments, of which the following is a full, clear, and exact description.

My invention has relation to harness attachments adapted to be applied to the harness of racing-horses when such horses are pulling sulkies or like vehicles; and it consists in the novel construction and arrangements of its parts, as hereinafter described.

My attachment is generally known as the "one-minute" harness attachment.

The object of my invention is to provide an attachment that may be applied to any harness-saddle, said attachment coupling the horse with the vehicle and dispensing with the use of breast-straps, collars, and breeching, and thus removing all impediment to the action of the horse in trotting or pacing.

The further object of my invention is to provide such an attachment which will pivotally connect the horse to the vehicle and thus relieve the vehicle of any up-and-down motion, generally termed "horse" motion.

The further object of my invention is to provide an attachment which when used with sulkies will effectively brace the shafts of the sulky and prevent said shafts from twisting or bending out of their proper alinement.

The further object of my invention is to provide such an attachment that is thoroughly adjustable in all its parts and can be readily accommodated to horses of different size.

The further object of my invention is to provide such an attachment with a thimble of especial construction, said thimble being adapted to receive the end of the shaft.

In the accompanying drawings, Figure 1 is a side view of the horse attached to a sulky, showing my attachment located on the harness. Fig. 2 is a side view of the attachment detached from the harness. Fig. 3 is a longitudinal sectional view of the thimble used on the attachment. Fig. 4 is a side view of the forward portion of a modified form of the harness attachment.

In the form of the attachment as shown in Fig. 4 the holdback-straps 7 and 10 are formed by splitting a wider strap. The forward ends of the holdback-straps 7 and 10 are secured to the thimble 1. The rear ends of the straps 7 and 10 pass, respectively, through a suitable eye 8 on the buckle 9 and the ring 11 and are secured by means of the buckles 21 and 22, as shown.

The attachment consists of the thimble 1, said thimble being made, preferably, of leather and being conical in shape. The forward end of the thimble 1 is closed by the plug 2, said plug being preferably made of wood. The thimble is preferably made of leather. The shank of the strip 3 is secured on the outer side of the thimble 1, the rear end of said strip being bifurcated and forming the straps 4 4. Said straps are folded back on each other, and the extreme ends of the straps are secured in the interior of the thimble 1 opposite the shank of the strip 3. A buckle 5 is located at the extreme rear end of each fold of each strap 4. A keeper 6 is located on the thimble 1 immediately above the strip 3. The upper holdback-strap 7 is secured at its front end to the upper buckle 5, the free end of said strap 7 passing under the keeper 6. The rear end of said strap is secured to the eye 8 of the buckle 9. The lower holdback-strap 10 is secured at its forward end to the lower buckle 5, the free end of said strap 10 also passing under the keeper 6. The rear end of the strap 10 is secured to the ring 11. The billet 12 is secured to the lower side of the buckle 9. Said billet is adapted to support a tug of ordinary construction. The forward end of the trace 13 is bifurcated, and the upper bifurcated end of said trace passes through the eye 14 of the buckle 9, and the extreme end of the upper bifurcated end of the trace is secured by means of a buckle 15 to an intermediate point of the said upper end of the trace. The lower bifurcated end of the trace 13 passes through the ring 11 and is secured by means of a buckle 16 to an intermediate point of the lower bifurcation. The billet 17 passes through the ring 11 between the lower bifurcation of the trace 13 and the holdback-strap 10. The trace 13 is provided at its rear end with a number of perforations 18, said perforations being adapted to receive the ends of the singletree.

The attachment as thus described may be applied to any harness by removing the tug from the tug-strap and passing the tug-strap through the buckle 9 and locating the said buckle at the proper height on the said tug-strap. The buckle 9 will then rest on the saddle of the harness, as shown in Fig. 1. The tug is then replaced on the lower end of the tug-strap, and thus the attachment is applied to the harness.

When the attachment is applied to the harness as thus described, the shafts are run through the tugs and the ends of the shafts enter the thimbles 1. The girth-strap 19 is then wound about the shaft behind and in front of the tug, and the free end of said strap 19 is secured in the buckle 20, said buckle 20 being located on the belly-band of the harness. The billet 17 is then secured in the buckle 20 on top of the end of the strap 19. By adjusting the traces and the upper and lower holdback-straps in the buckles 15 16 and 5 5 the length of the attachment is regulated to the size of the particular horse. By adjusting the perpendicular position of the buckle 9 on the tug-strap and by adjusting the billet 17 in the buckle 20 the attachment is perpendicularly adjusted at three points on each side of the horse to meet the circumference of the horse's body. It will be seen that when the attachment is thus applied the ends of the shafts of a sulky are braced between the thimble and the tug, and the holdback-straps 7 and 10 prevent any bending or rocking motion of the shafts.

With such an attachment as above described the rings 11 11 are in substantially the same line transversely as the pivotal point of the horse's body while he is trotting or pacing, and as the straps 10 10, the billet 17, and the lower bifurcations of the traces 13 have a limited amount of play within the rings 11 the said motion compensates for the oscillatory motion of the horse's body. No horse motion is transmitted to the sulky.

It will also be seen that the lower bifurcations of the traces and the lower holdback-straps 10 prevent the belly-band from slipping either back or forward under the horse, and thus the belly-band is held in its proper place and is not permitted to rub the elbows of the horse's front legs.

Having thus described my invention, what I claim as new, and desire to secure by Letters Patent of the United States, is—

1. A harness attachment consisting of a thimble adapted to receive the end of the shaft, holdback-straps secured to said thimble, a buckle attached to the end of the upper holdback-strap, said buckle adapted to receive the tug-strap of the saddle of the harness, a billet attached to said buckle, said billet adapted to support the tug, a ring secured to the end of the lower holdback-strap, a billet located on said ring, said billet adapted to enter a buckle on the belly-band, a trace having its forward end bifurcated, the upper bifurcation being secured to the tug-strap buckle and the lower bifurcation being attached to the ring.

2. A harness attachment consisting of a thimble adapted to receive the ends of the shaft, holdback-straps attached at their forward ends to said thimble, the rear end of the upper holdback-strap being adapted to be made fast to a stationary part of the harness, the rear end of the lower holdback-strap being adapted to be connected to the belly-band of the horse, a connection connecting the rear end of the upper end of the holdback-strap with the belly-band, said connection surrounding the shaft, a trace having its forward end bifurcated, the upper bifurcation of said trace being connected to the rear end of the upper holdback-strap and the lower bifurcation of the trace being connected to the rear end of the lower holdback-strap.

3. In an attachment such as described, a thimble adapted to receive the end of the shaft, the forward end of the thimble being closed, a strap secured at its shank to the outer side of the thimble, the rear end of said strap being bifurcated, said rear ends being folded down and secured to the inner side of the thimble, a keeper secured to the thimble over the shank of the strap-buckles located at the outer ends of the folds of the bifurcations of the strap, said buckles adapted to receive the holdback-straps, the ends of the holdback-straps adapted to pass under the keeper attached to the thimble.

In testimony whereof I affix my signature in presence of two witnesses.

JOHN H. SNAPP.

Witnesses:
A. E. GLASCOCK,
BERTHA L. DANA.